United States Patent
Katayama et al.

(10) Patent No.: US 6,757,441 B1
(45) Date of Patent: Jun. 29, 2004

(54) IMAGE DATA ENCODING/DECODING METHOD AND APPARATUS

(75) Inventors: Akihiro Katayama, Yokosuka (JP); Daisuke Kotake, Yokohama (JP); Yukio Sakagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 653 days.

(21) Appl. No.: 09/653,002

(22) Filed: Aug. 31, 2000

(30) Foreign Application Priority Data

Dec. 22, 1999 (JP) ............................................. 11-365032

(51) Int. Cl.$^7$ ................................................. G06K 9/36
(52) U.S. Cl. ..................................................... 382/248
(58) Field of Search ................................. 382/232, 236, 382/238, 240, 242, 248, 250; 358/432, 433; 348/384.1, 394.1, 395.1, 400.1–404.1, 407.1–416.1, 420.1–421.1, 425.2, 430.1–431.1; 375/240.02–240.03, 240.12–240.16, 240.18, 240.2, 240.22–240.25

(56) References Cited

U.S. PATENT DOCUMENTS 6,031,573 A * 2/2000 MacCormack et al. .. 348/401.1
6,104,754 A * 8/2000 Chujoh et al. ............... 375/240

FOREIGN PATENT DOCUMENTS

JP           10-111951          4/1998

OTHER PUBLICATIONS

"An Algorithm for Vector Quantizer Design", Y. Linde, et al., IEEE Transactions on Communications, vol. COM–28, No. 1, Jan. 1980.

"A Simplified Inverse Transform method for Decoding DCT Compressed Video Data", Y. Miyamoto, et al., The Institute of Electronics Engineers, 1994 Spring Conference D–308, p. 7–41.

* cited by examiner

*Primary Examiner*—Jose L. Couso
(74) *Attorney, Agent, or Firm*—Fitzpatrick, Cella, Harper & Scinto

(57) ABSTRACT

There is disclosed an image data encoding/decoding method and apparatus which can efficiently encode multi-viewpoint image data obtained by sensing a single object from many viewpoints, and can obtain decoded data in units of pixels at high speed. Reference images which are not encoded are set every predetermined number of images (S701), and encoding is done using only the relationship with this reference image. An orthogonal transform is used in encoding, and an inverse transform formula for each pixel in a block is expanded and stored upon computing the orthogonal transform (S704). The coefficients after the orthogonal transform are fixed-length encoded in units of pixels (S705). Upon decoding, fixed-length encoded data corresponding to desired pixels are decoded, and pixel data are decoded by substituting coefficients obtained by decoding in the expansions generated upon encoding.

29 Claims, 14 Drawing Sheets

FIG. 6

| [3,4] | [5,3] | [3,2] | [3,2] | [3,1] | [3,1] | [3,1] | [5,1] | [2,1] | [4,1] | [1,1] |
| --- | --- | --- | --- | --- | --- | --- | --- | --- | --- | --- |
| [5,4] | [3,4] | [5,3] | [3,2] | [3,2] | [5,2] | [2,2] | [2,2] | [4,2] | [1,2] | [1,2] |
| [5,4] | [5,4] | [3,4] | [5,3] | [2,3] | [2,3] | [4,3] | [4,3] | [1,3] | [1,3] | [1,2] |
| [5,4] | [5,4] | [3,4] | [3,4] | [4,5] | [4,4] | [4,4] | [1,4] | [1,4] | [1,3] | [1,3] |
| [2,5] | [3,5] | [3,5] | [3,4] | [4,5] | [4,5] | [1,5] | [1,5] | [1,5] | [1,4] | [1,3] |

IMAGE DATA ENCODING/DECODING METHOD AND APPARATUS

FIELD OF THE INVENTION

The present invention relates to an image data encoding/decoding method and apparatus and, more particularly, to an encoding/decoding method and apparatus which can decode encoded image data in units of pixels.

BACKGROUND OF THE INVENTION

As a conventional method of generating a three-dimensional image at an arbitrary viewpoint position, a method of expressing a three-dimensional object by a plurality of small triangular planes (polygons), and computing the luminance values of respective polygons on the basis of a given viewpoint is well known.

However, as the shape of a three-dimensional object becomes complicated, it becomes harder to express the object using polygons. In such case, even when smaller polygons are used, visual disturbance cannot be eliminated. As polygons becomes smaller, the data volume for expressing the object and the computation volume required for generating a three-dimensional image at an arbitrary viewpoint increase.

On the other hand, as a method of generating a three-dimensional image, in which the data volume does not depend on the object shape, a method using a ray space is known. This method is one of methods for generating and displaying an image at an arbitrary viewpoint position using a group of images actually captured at a plurality of viewpoint positions, and is based on the ray space concept that defines a three-dimensional object as a set of light rays propagating in a three-dimensional space.

According to this concept, since an image of a three-dimensional object viewed from an arbitrary viewpoint is generated by computing the luminance values of pixels that form a visible area of the three-dimensional object, the computation volume upon expressing the object depends only on the number of pixels that express the visible area and does not depend on its shape. Since the shape can be expressed by pixels, an image of even an object with a complicated shape can be accurately reconstructed. In addition, since actually captured images are used, a virtual space with high reality, which cannot be obtained by a method based on three-dimensional geometric models can be expressed.

The concept of a ray space will be further explained below. In a three-dimensional space, light rays coming from a light source, light rays reflected by objects, and the like exist. A light ray that passes through a given point in the three-dimensional space is uniquely defined by five variables that express its position (x, y, z) and direction ($\theta$, $\phi$). If a function that represents the light intensity of this light ray is defined as f, light ray group data in the three-dimensional space can be expressed by f(x, y, z, $\theta$, $\phi$). Furthermore, if a change over time in light ray group data is taken into consideration, that group data is expressed by f(x, y, z, $\theta$, $\phi$, t), i.e., the light ray group in the three-dimensional space is described as a six-dimensional space. This space is called a "ray space".

A light ray group that passes through a plane (reference plane) Z=0 for t=0 will be examined. If a horizontal plane (X-Z plane) perpendicular to the Y-axis is considered, and disparity in the vertical direction is ignored (y=0), a real space is expressed as shown in FIG. 13 for respective values of $\phi$. A light ray group coming from the reference plane is described by f(x, $\theta$) using two variables, i.e., position x and angle $\theta$. Therefore, a light ray group that passes a given point P(X, 0, Z) in the real space satisfies for each $\phi$:

$$X = x + Z \tan \theta \quad (1)$$

If a variable u=tan$\theta$ is defined, equation (1) is rewritten as:

$$X = x + uZ \quad (2)$$

Therefore, in the ray space, a single light ray in the real space is mapped onto one point, and the light intensity, i.e., color information, is recorded there. Also, as can be seen from equation (2), a light ray group that passes through a certain point in the real space is mapped onto a straight line in the x-u space.

FIG. 14 shows the state wherein light rays observed at a viewpoint position P(X, 0, Z) in the real space, and light rays observed from other viewpoint positions are mapped in the x-u space. Note that the x-u space forms a partial space of the aforementioned five-dimensional ray space. In this manner, when an image is captured from a sufficiently large number of viewpoints, the x-u space can be densely filled with data.

In order to accurately reconstruct an image at an arbitrary viewpoint position from this ray space, the y-axis direction, i.e., a dimension in the vertical direction, is required. However, in this case, ray space data must form at least a four-dimensional space x-y-$\theta$-$\phi$, and has a very large data size. Hence, conventionally, only the x-u space as a partial space of the ray space is considered. Furthermore, it is very redundant to provide color information to the entire coordinate system of the ray space. Because, even when only the x-u space is considered, pixel information in the y-axis direction is required to reconstruct an image, a three-dimensional ray space must be formed, and the light intensity of each light ray must be recorded there. To overcome this problem, a method of obtaining luminance values from multi-viewpoint images (images captured from a plurality of different viewpoint positions) loaded onto a memory by making ray space computations for all pixels of the image to be reconstructed is proposed. Note that the ray space computation is a computation made based on equation (2) in the x-u space to reconstruct an image at an arbitrary viewpoint position on the basis of multi-viewpoint images.

However, in the prior art, since the x-u space considers only disparity in the x-axis direction (horizontal direction), an identical ray space computation must be repeated for all scan lines in the y-axis direction. In order to generate and display an image at an arbitrary viewpoint position in real time in correspondence with motions of the operator, high-speed ray space computations are required. In order to implement such computations, operations for randomly accessing multi-viewpoint images and reading pixel data must be done. That is, high-speed random access to multi-viewpoint images is required. Hence, in the aforementioned example, the x-u space and multi-viewpoint images are loaded onto the memory in advance.

In this fashion, conventionally, upon generating and displaying an image at an arbitrary viewpoint position, an identical ray space computation must be repeated, and a work memory having a very large size must be used. A large number of times of computations required for obtaining pixel data often impair real-time motions. Also, when ray space data that describes an object have a huge data size and all such data must be loaded onto the memory, the number of objects that can be expressed in a three-dimensional virtual environment using the ray space is limited. In order to display an image in real time, repetitive computations must be avoided, and in order to lay out many objects described using ray space data in a three-dimensional virtual environment, the work memory size occupied by the ray space data must be minimized.

For this reason, as described in, e.g., Japanese Patent Laid-Open No. 10-111951, a method of encoding multi-viewpoint data, which are captured to generate an arbitrary viewpoint image of a given three-dimensional object, to reduce its data size has been proposed.

In order to generate three-dimensional object image data at an arbitrary viewpoint using the ray space theory, multi-viewpoint image data obtained by sensing that object through 360° are required. For example, a three-dimensional object is placed on a turntable, and its image is captured every time the object is rotated a predetermined angle in the horizontal direction, thus preparing multi-viewpoint image data for 360°. In order to generate data when the object is viewed from the above and below, multi-viewpoint images are captured by rotating the object also in the vertical direction.

Hence, as the predetermined angle is smaller, images with high correlation can be captured successively. In the method of Japanese Patent Laid-Open No. 10-111951, which exploits such high correlation, reference images, which are not encoded, of multi-viewpoint image data before compression (encoding) are periodically set, and each of remaining image data is encoded to pointer values indicating pixels having the closest values of pixel data included in two reference images which have strong correlation (close image sensing angles) to that image data, thus reducing the total size of image data.

However, in the encoding method described in Japanese Patent Laid-Open No. 10-111951, since each reference image is raw data which is not encoded, if many reference images are set, the image data size reduction effect becomes low. However, when the number of reference images is reduced, the number of image data having low correlation to the reference images increases, and the quality of a decoded image deteriorates. Hence, in such case, the practical data size reduction effect is not so high.

On the other hand, since successive image data having strong correlation can be considered as moving image data like a television signal or video signal, a known moving image data encoding method may be applied. However, since MPEG as a standard moving image data encoding method encodes and decodes image data in units of blocks, it cannot be directly applied to image generation based on the ray space theory that must extract decoding results from different multi-viewpoint images in units of pixels at high speed.

The present invention has been made in consideration of the conventional problems, and has as its object to provide an image data encoding/decoding method and apparatus, which can efficiently encode multi-viewpoint image data obtained by sensing a single object from many viewpoints, and can obtain decoded data in units of pixels at high speed.

SUMMARY OF THE INVENTION

More specifically, the gist of the present invention lies in a method of encoding an image data group including a plurality of image data, comprising: the reference image selection step of selecting a predetermined number of reference image(s) from the plurality of image data; the orthogonal transform step of computing an orthogonal transform of each of image data other than the reference images in units of blocks each having a predetermined size; the step of selecting a preset number of data as data to be encoded from the data obtained after the orthogonal transforms are computed; and the encoding step of fixed-length encoding and outputting the data to be encoded as encoded image data.

Another gist of the present invention lies in an image data decoding method for decoding encoded image data in units of fixed-length encoding for the data on the basis of the encoded image data which have undergone fixed-length encoding after orthogonal transform in units of blocks, and inverse transform formulas of the orthogonal transform, which are prepared in advance in units of pixels in each block, comprising: the first decoding step of decoding the fixed-length encoded data; the number determination step of determining the number of coefficients used in the formulas from coefficients of the orthogonal transform obtained in the first decoding step; and the second decoding step of decoding pixel data by applying the number of coefficients determined in the number determination step to the inverse transform formulas.

Still another gist of the present invention lies in an apparatus for encoding an image data group including a plurality of image data, comprising: reference image selection means for selecting a predetermined number of reference image(s) from the plurality of image data; orthogonal transform means for computing an orthogonal transform of each of image data other than the reference images in units of blocks each having a predetermined size; selection means for selecting a preset number of data as data to be encoded from the data obtained after the orthogonal transforms are computed; and encoding means for fixed-length encoding and outputting the data to be encoded as encoded image data.

Still another gist of the present invention lies in an image data decoding apparatus for decoding encoded image data in units of fixed-length encoding for the data on the basis of the encoded image data which have undergone fixed-length encoding after orthogonal transform in units of blocks, and inverse transform formulas of the orthogonal transform, which are prepared in advance in units of pixels in each block, comprising: first decoding means for decoding the fixed-length encoded data; number determination means for determining the number of coefficients used in the formulas from coefficients of the orthogonal transform obtained by the first decoding means; and second decoding means for decoding pixel data by applying the number of coefficients determined by the number determination means to the inverse transform formulas.

Still another gist of the present invention lies in a virtual image generation apparatus comprising: table generation means for mapping in a ray space a plurality of pixels included in a predetermined area of each of a plurality of image data obtained by sensing an identical object from different viewpoints, and generating a table indicating a correspondence between coordinates in the ray space and pixel positions in the image data; reference image selection means for selecting a predetermined number of reference image(s) from the plurality of image data; orthogonal transform means for computing an orthogonal transform of each of image data other than the reference images in units of blocks each having a predetermined size; formula generation means for generating an inverse formula of the orthogonal transform in units of pixels that form the block; encoding means for fixed-length encoding the image data that have undergone the orthogonal transform and outputting the transformed image data as encoded image data; light ray conversion means for converting the object into a light ray group on the basis of externally supplied data indicating a viewpoint position and direction; pixel position detection means for detecting a pixel position of each of light rays included in the converted light ray group in the corresponding image data with reference to the table; first decoding means for decoding the fixed-length encoded data corresponding to the pixel position detected by the pixel position detection means; number determination means for determining the number of coefficients used in the formulas from coefficients of the orthogonal transform obtained by the first decoding means; second decoding means for decoding pixel data by applying the number of coefficients determined by the number determination means to the inverse transform formulas; and image generation means for generating an image of the object viewed from the viewpoint position and direction on the basis of the decoded pixel data.

Still another gist of the present invention lies in an mixed reality space presentation system having: viewpoint position information acquisition means for acquiring a viewpoint position and direction of a user; and display means for presenting to the user an mixed reality space obtained by mixing a real space and a virtual space image, wherein an image of an object viewed from the viewpoint position and direction of the user is generated using a virtual image generation apparatus, and is displayed on the display means.

Still another gist of the present invention lies in a storage medium which stores, as a program that can be executed by a computer apparatus, an image data encoding method and/or image data decoding method according to the present invention.

Still another gist of the present invention lies in an image encoding apparatus comprising: selection means for selecting a predetermined image as a reference image from a plurality of continuous images in accordance with a predetermined relationship; block matching means for performing block matching between the reference image and an image except for the reference image; first data generation means for generating first data made up of identification data representing the reference image used in matching by said block matching means and position data representing a positional relationship with a matching block with respect to the reference image of a block of the image; second data generation means for generating second data representing a difference between the reference image and the image; and encoding means for quantizing the second data into a fixed-length code and outputting the fixed-length code.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 shows the correspondence table after interpolation;

DETAILED DESCRIPTION OF THE PREFERRED EMBODIMENTS

Preferred embodiments of the present invention will now be described in detail in accordance with the accompanying drawings.

(System Arrangement)

Figure 1:
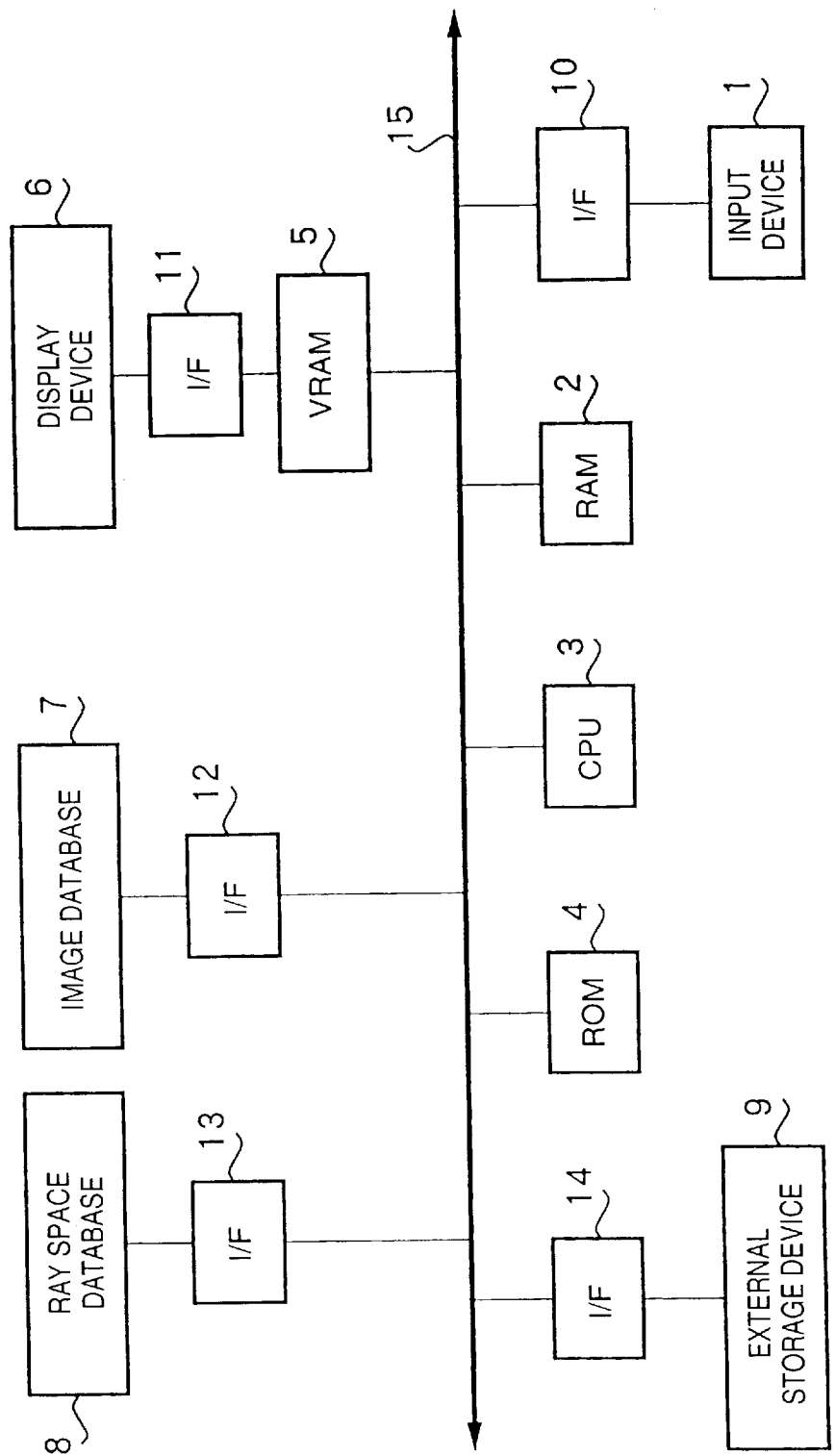
FIG. 1 is a block diagram showing the arrangement of an mixed reality space presentation system according to an embodiment of the present invention.

FIG. 1 is a block diagram showing an example of the arrangement of an mixed reality space presentation system to which an encoding/decoding method of the present invention can be applied. In the following description, the mixed reality space presentation system in this embodiment will be explained as a system that presents an mixed reality space to the user by superimpose-displaying a three-dimensional object image generated using the ray space theory on a display device, for example, an optical see-through HMD (virtual image(s), such as computer graphics image(s), are displayed on a see-through type display) that the user wears. However, the encoding/decoding method according to the present invention is a versatile one for an image data group (including a moving image) including successive image data having relatively high correlation, and can be applied to applications other than that to be described below.

Referring to FIG. 1, an input device 1 comprises a keyboard, mouse, and the like, and is used to input setup values, instructions, and the like to the system. A RAM 2 is used to load a program to be executed by a CPU 3, and serves as a work area. The CPU 3 controls the overall system of this embodiment. Image data encoding and decoding processes to be described below are implemented when the CPU 3 executes programs.

A ROM 4 stores a program and the like to be executed by the CPU 3. A VRAM 5 is a video RAM for display. An image database 7 stores encoded image data obtained by encoding multi-viewpoint image data captured in advance. A ray space database 8 stores correspondence tables which indicates the correspondence between multi-viewpoint image data captured in advance, and ray space data. An external storage device 9 stores a program to be executed by the CPU, multi-viewpoint image data before encoding, and the like.

The image database 7, ray space database 8, and external storage device 9 are connected to a CPU bus 15 respectively via interfaces 12, 13, and 14. These databases and storage device can comprise rewritable storage devices such as a hard disk drive (HDD), DVD-RAM drive, and the like, or may be given areas of one devices. A display device 6 is an HMD that the user wears in this embodiment, and is connected to the VRAM 5 via an interface 11. The system shown in FIG. 1 may have another display device in addition to the display device 6.

The system of this embodiment is characterized in that ray space data are considered as a set of multi-viewpoint images and a two-dimensional correspondence table in place of holding multi-valued image data mapped in the ray space, and multi-viewpoint images are encoded (compressed) to reduce the total data size.

Figure 13:
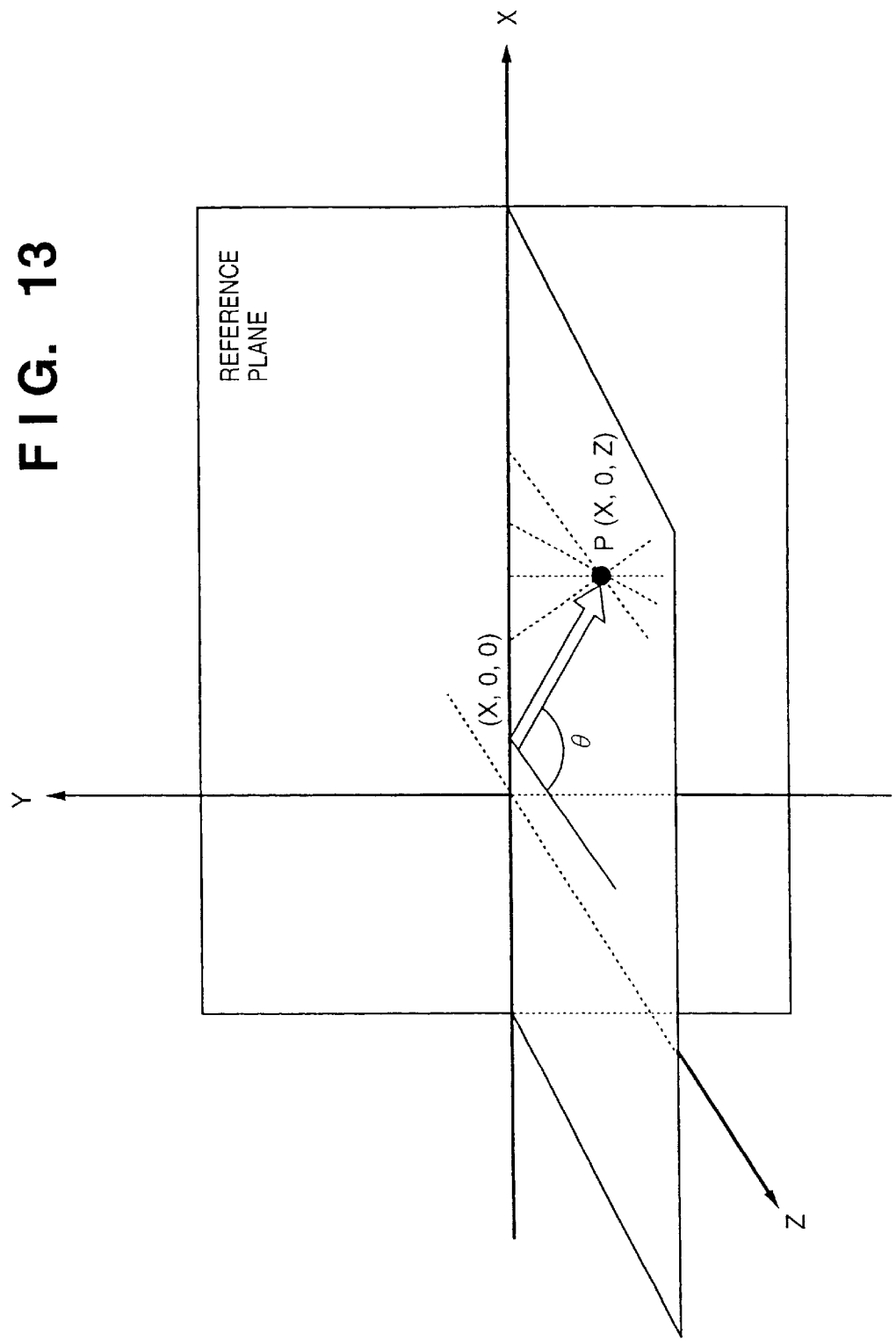
FIG. 13 is a view showing a real space in the ray space theory.
Figure 14:
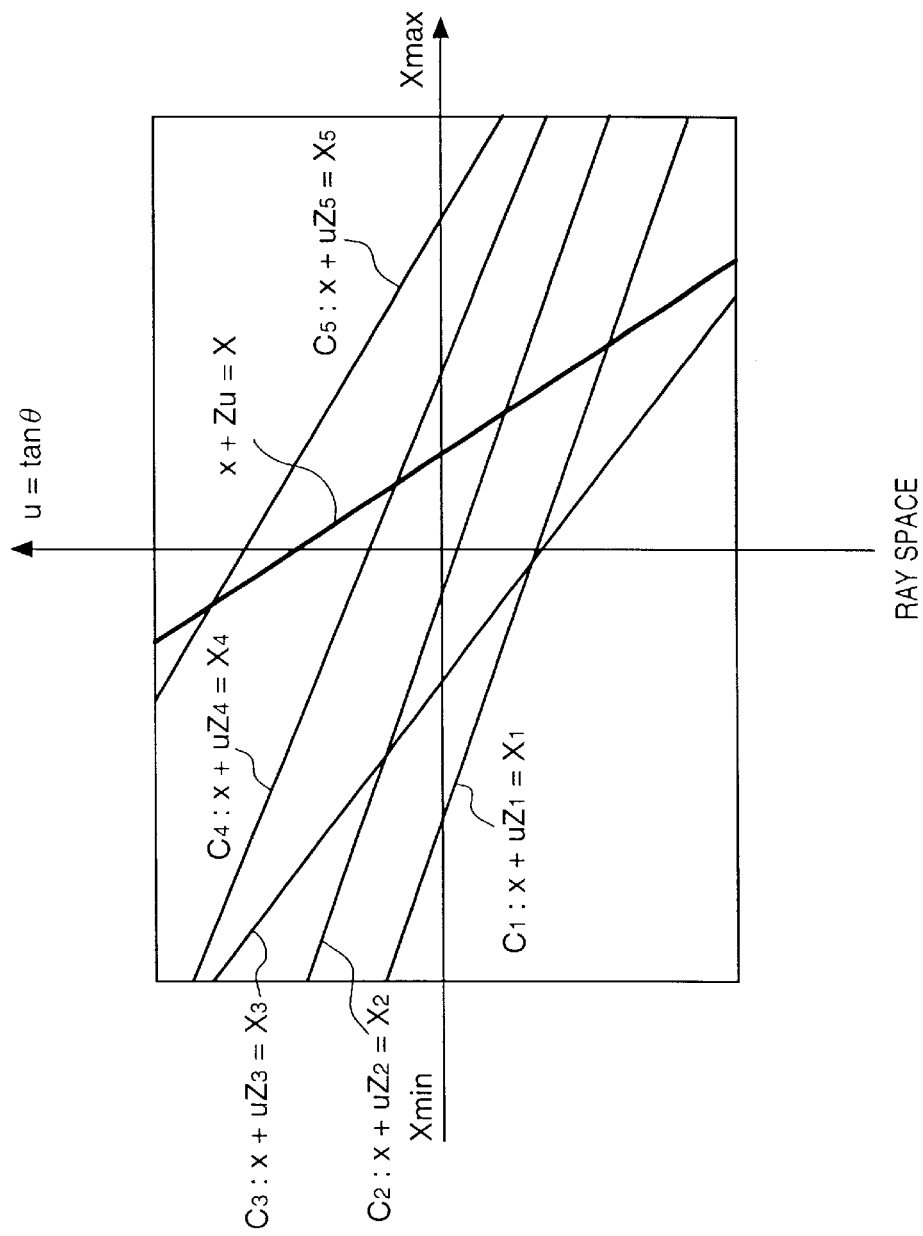
FIG. 14 is a view showing the mapping state of light rays in the real space into the ray space.

More specifically, mapping of multi-viewpoint image data in the ray space is given by equation (2) described above, which equation does not include any component in the height direction (Y-axis direction) of an image. Therefore, as shown in FIG. 13, pixel data in a given column included in one image data of the multi-viewpoint image data are mapped onto a single point. At this time, in place of recording a pixel value in a ray space f(x, u), a correspondence table that records the image nuber of the image which includes that pixel, and the column position in the image is generated.

On the other hand, by encoding multi-viewpoint image data so that they can be randomly decoded in units of pixels, when a set of correspondence table and encoded multi-viewpoint image data is stored, an inverse mapping computation from the ray space to multi-viewpoint images upon reconstruction can be implemented by looking up the table, thus allowing high-speed processes. Since the correspondence table and input multi-viewpoint images whose data sizes are compressed by encoding need only be used, the required data size can be reduced compared to a case wherein all multi-viewpoint image data are mapped in the ray space and their pixel values are stored.

More specifically, in the system of this embodiment, generation of the correspondence table and compression of multi-viewpoint image data are done in advance to store these results, and pixel data of required multi-viewpoint image data are decoded by looking up the correspondence table on the basis of viewpoint position (posture) information given in real time later, thus generating an image.

(Overall Process)

Figure 2:
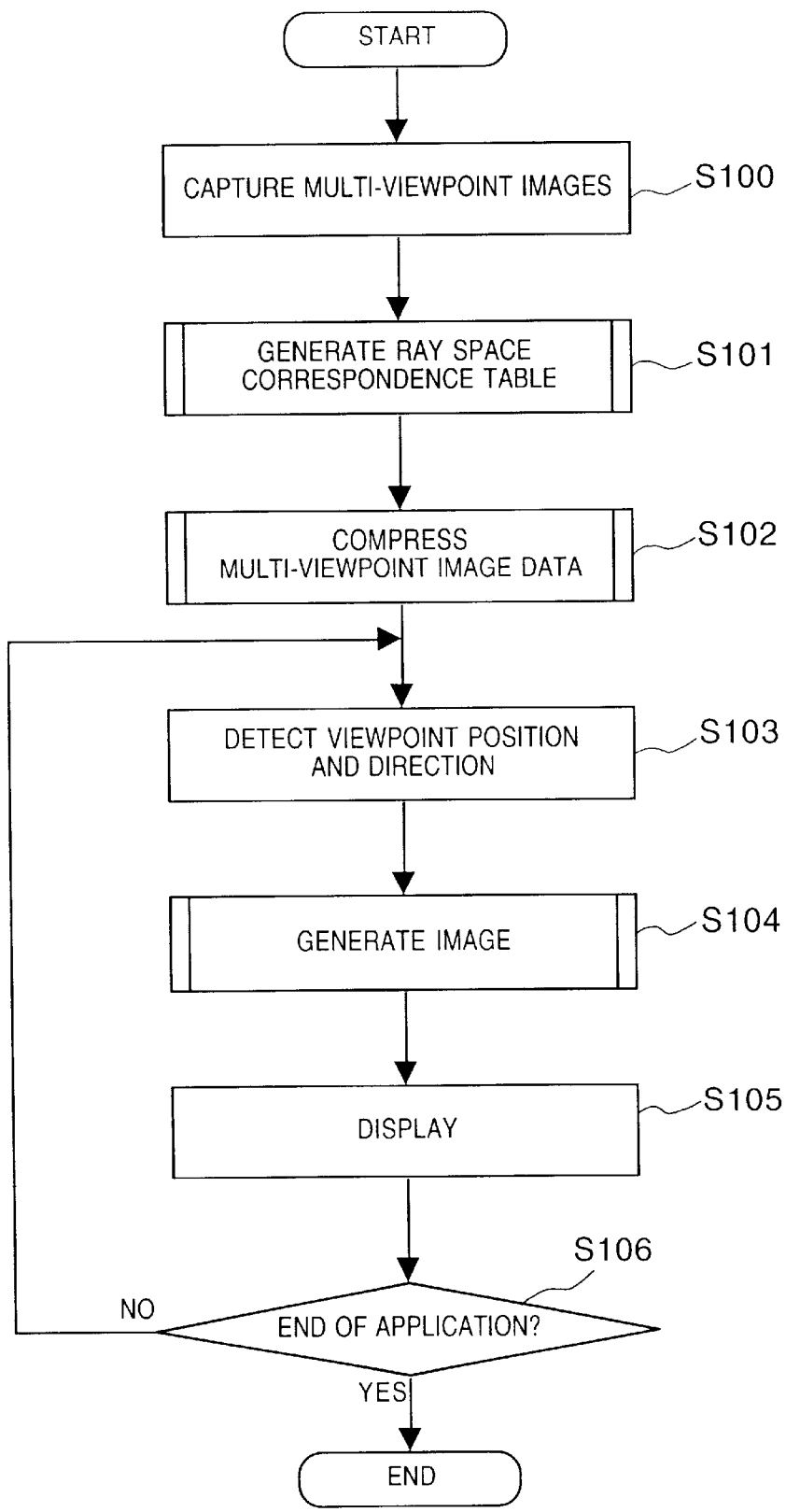
FIG. 2 is a flow chart showing the flow of the overall process in the system shown in FIG. 1.

FIG. 2 is a flow chart showing the flow of the overall process in the system of this embodiment.

In step S100, multi-viewpoint images (E images) of a three-dimensional object, which is to undergo image generation, are captured using a CCD still camera or the like, from different locations, and are stored in the image database 7. In step S101, a correspondence table between the ray space and multi-viewpoint image data is generated based on the E image data stored in the image database 7. A method of generating the correspondence table will be explained in detail later.

When the correspondence table indicating the correspondence between the ray space data and image data is held, since generation of an arbitrary viewpoint image (to be described later) can be done by looking up the correspondence table, high-speed processes can be achieved. The generated correspondence table is stored in the ray space database 8.

Upon completion of generation of the correspondence table, multi-viewpoint image data undergo compression (FIG. 2, step S102). The present invention aims at encoding that allows easy decoding units of pixels and can compress large size data in this compression. The compression process will be described in detail later. The multi-viewpoint image data that have undergone compression are stored in the image database 7.

The processes in steps S100 to S102 are executed before an image generation process based on viewpoint position and direction information.

In step S103, the user's viewpoint position and direction are detected based on an input from, e.g., a sensor or the like attached to the HMD 6 that the user wears. Based on this viewpoint position and direction information, the ray space database 8 is searched for pixel data in the corresponding multi-viewpoint image. A virtual space image is generated by decoding required data in units of pixels from the encoded multi-viewpoint image data stored in the image database 7 (step S104), and is displayed at an appropriate position on the HMD 6 (step S105). The image generation process will be explained in detail later.

It is checked in step S106 if the application of the mixed reality space presentation system is to end. If the process is to continue, the flow returns to step S103. If the process is to end, the overall process ends.

(Correspondence Table Generation Process)

Figure 3:
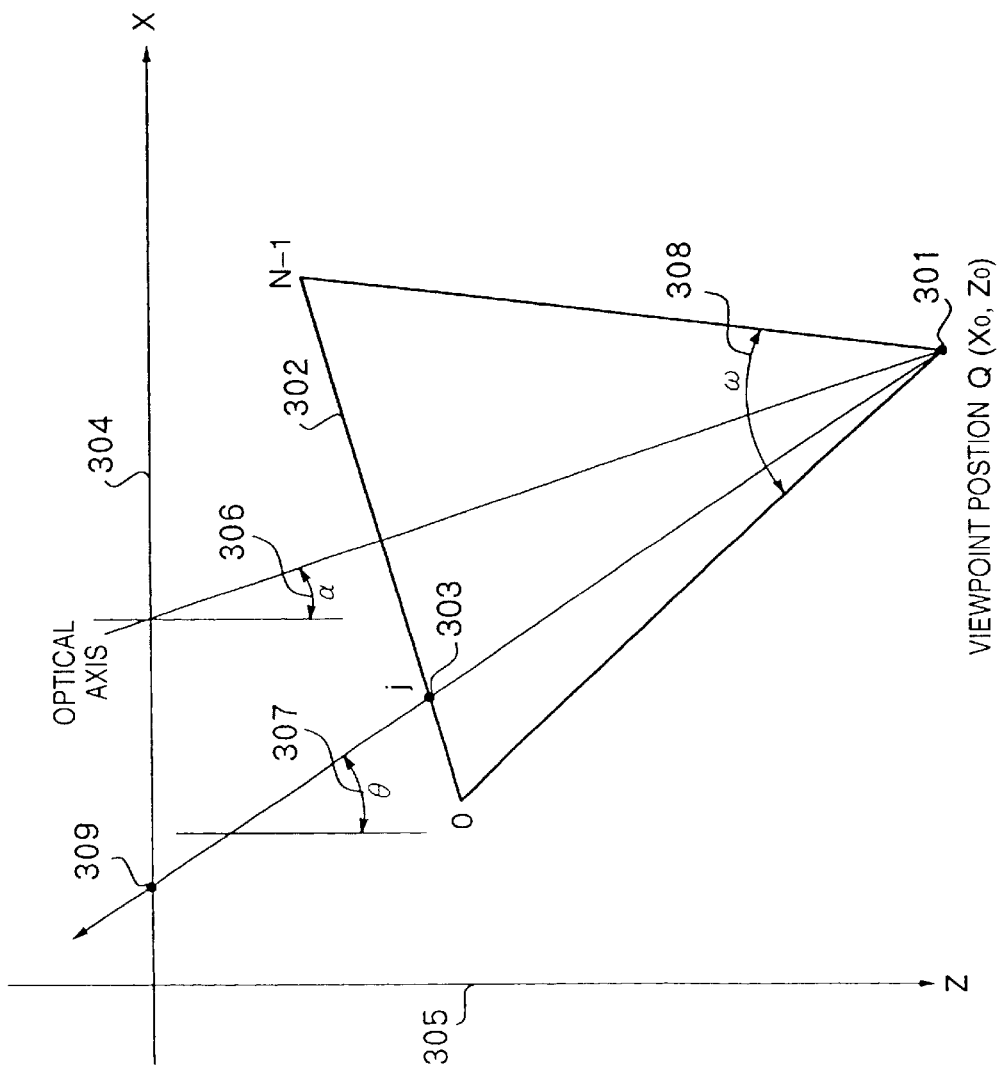
FIG. 3 is a view for explaining sensing of multi-viewpoint images.

The generation process of the correspondence table between the ray space and multi-viewpoint image data will be described in detail below with reference to FIGS. 3 to 6. FIG. 3 shows a situation wherein an image is captured by placing a camera at a lens center position Q(x0, z0) (to be referred to as a viewpoint position hereinafter) so that its optical axis makes an offset angle α with the Z-axis. In FIG. 3, reference numeral 301 denotes the viewpoint position Q(x0, z0); 302, an image sensing plane; 303, the j-th pixel in an arbitrary line in the image sensing plane; 304, the X-axis; 305, the Z-axis; 306, an angle the optical axis makes with the Z-axis; 307, an angle θ a light ray that passes through the viewpoint position 301 and the pixel 303 makes with the Z-axis; 308, a field angle ω of the camera; and 309, a point where a light ray that passes through the j-th pixel intersects with the X-axis. If m represents the number of pixels per line in the image sensing plane, the angle θ 307 can be obtained by solving:

$$(m/2) \tan (\theta - \alpha) = (j - m/2) \tan (\omega/2) \qquad (3)$$

The light ray directions of data (E images×m pixels) of the first lines in the respective image data stored in the image database 7 are computed using equation (3), and these light ray groups are mapped in the ray space in accordance with equations (1) and (2).

Assuming that a light ray produced from the h-th (1≦h≦m) pixel in the main scan direction included in the first line in the k-th (1≦k≦E) image is mapped at a position (x1, u1) in the ray space (x-u space), data recorded in the ray space is a value (k, h) recorded at a coordinate position (x1, u1) in the ray space. That is, a value which indicates the correspondence between the position of the ray space and pixel data in multi-viewpoint image data is recorded.

Figure 4:
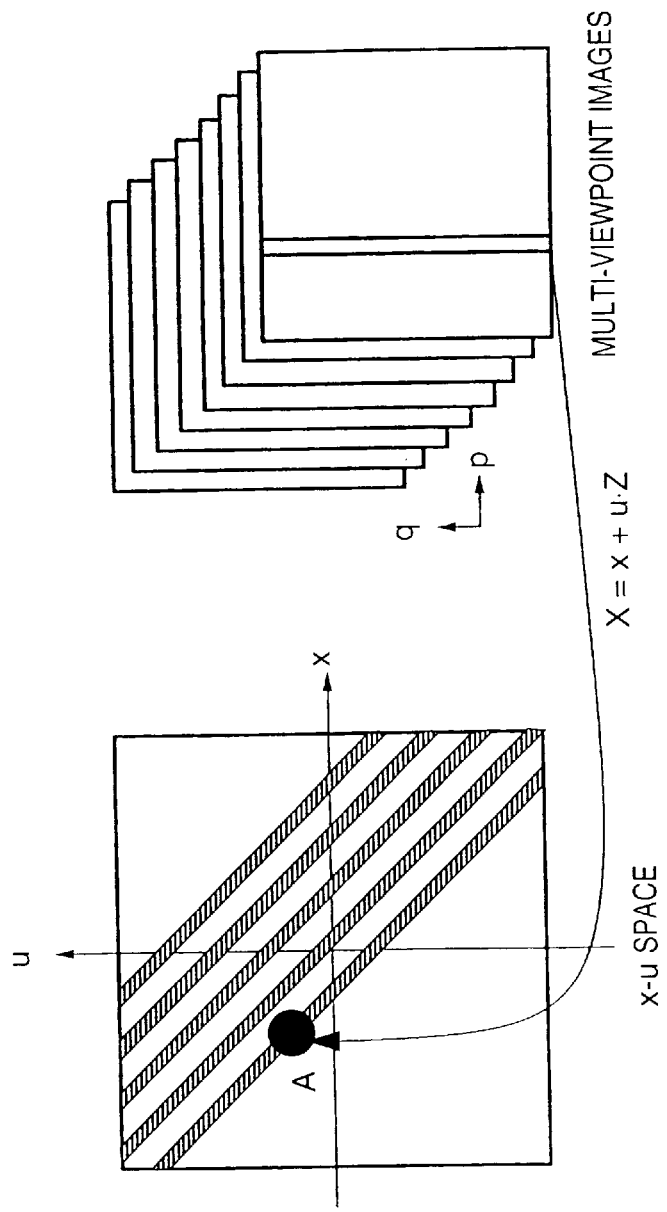
FIG. 4 is a view showing the relationship between multi-viewpoint image data and the ray space.

As for the reason why only data for the first line in each image data that forms the multi-viewpoint image data are mapped in the ray space, equations (1) and (2) do not include the term in the height (y) direction of an image, as can be seen from these equations. For this reason, as shown in FIG. 4, data in the second and subsequent lines of each image data are mapped at the same position (in the ray space) as that of data of the first line. Therefore, when only the data of the first line in each image are computed, the mapping position of other data in the ray space can be automatically obtained.

In this fashion, by computing only the first lines, the generation process of the correspondence table can be achieved at high speed. Also, the x- and u-axes are quantized so that the mapped ray space data maintain a resolution equivalent to that of multi-viewpoint image data.

Figure 5:
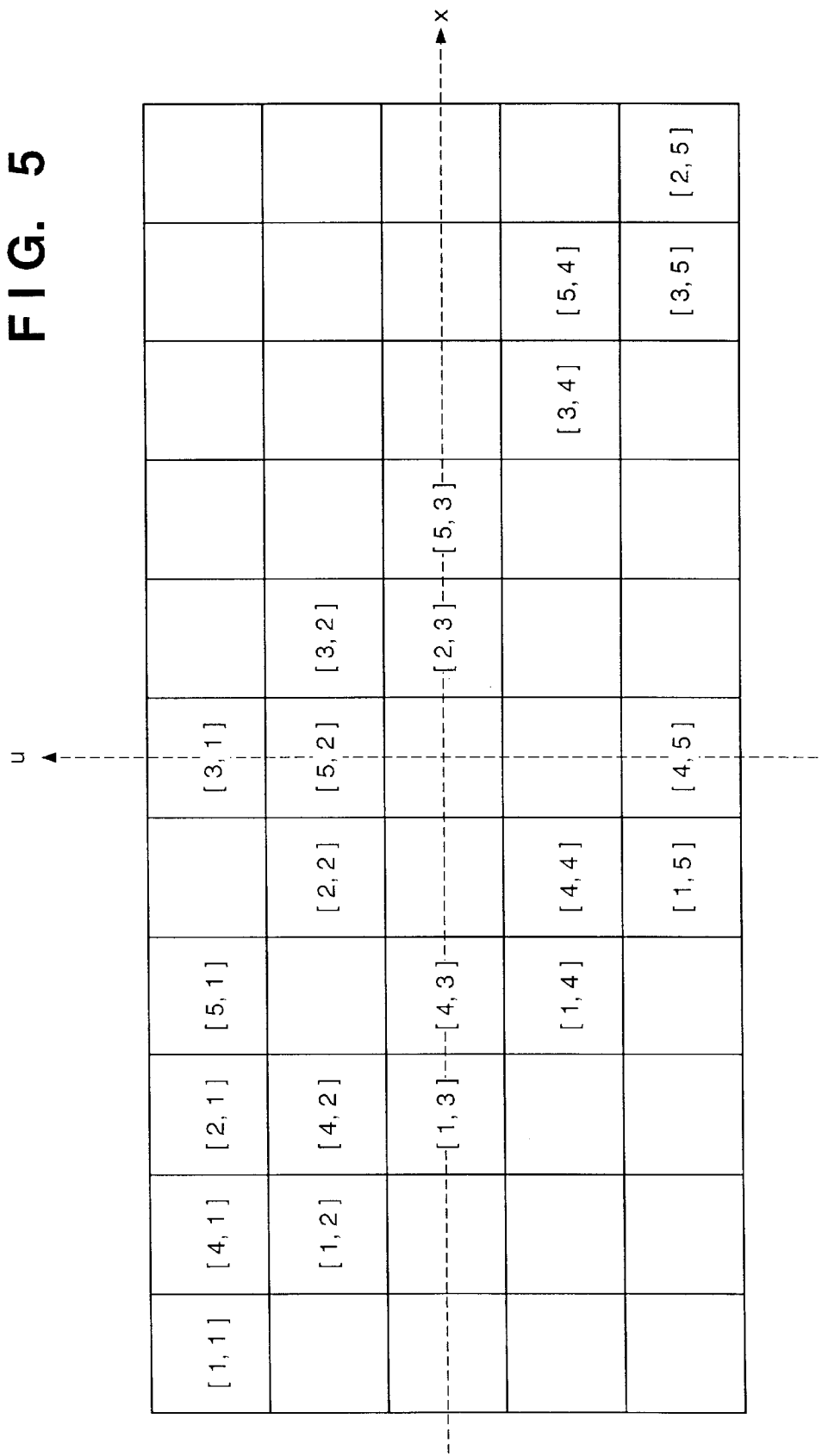
FIG. 5 shows a correspondence table before interpolation.

FIG. 5 shows an example of the correspondence table between the ray space and multi-viewpoint image data. For the sake of simplicity, this example has 11×5 elements since the x- and u-axes are quantized. Each element records a set of [image number, pixel number] corresponding to each light ray.

However, since multi-viewpoint images are captured at discrete viewpoint positions (camera positions), the table includes elements, the values of which are not determined yet (blanks in FIG. 5). For this reason, the values of the elements, which are not determined yet, are estimated. Various estimation methods are available, and an arbitrary method can be used. For example, the nearest neighbor method may be used. The estimated value is recorded in the corresponding element as a set of [image number, pixel number].

FIG. 6 shows an example of the final correspondence table obtained by estimation. The numerical values described in the respective elements of the table are combinations of [image number, pixel number in main scan direction]. The positions of the respective elements in the x- and u-directions are given, as shown in FIG. 6. For example, the value of element (0, 0) is [2, 3], and the value of element (1, 2) is [3, 1].

(Compression Process)

Figure 7:
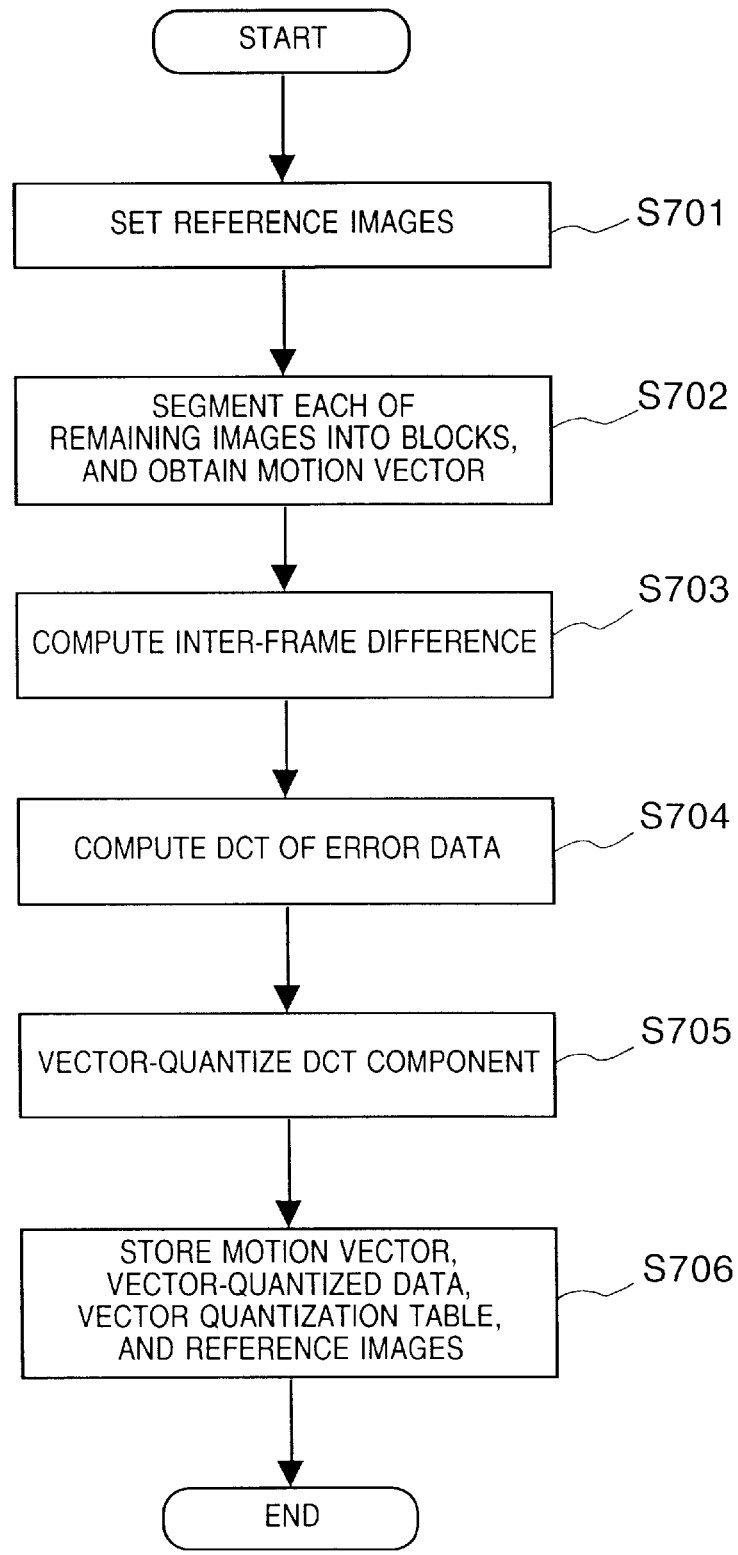
FIG. 7 is a flow chart for explaining an encoding process.

The compression process of the multi-viewpoint image data done in step S102 in FIG. 2 will be explained below using the flow chart shown in FIG. 7.

As described above, compression in the present invention requires the following two features:

1) high compression ratio; and
2) high-speed decoding in units of pixels.

For these purposes, the present invention executes high-efficiency encoding for images other than reference images, which are not encoded, using disparity (motion)-compensated prediction and DCT encoding, and also vector encoding (fixed-length encoding) to allow decoding in units of pixels.

Initially, reference images which do not undergo encoding are selected from a plurality of image data that form the multi-viewpoint images (step S701). More specifically, image data are arranged to have highest correlation between neighboring ones, and reference images are selected therefrom every predetermined number of images. Normally, since multi-viewpoint images are captured by placing an object on, e.g., a turntable and rotating the turntable a predetermined angle, reference images can be basically selected every predetermined number of images in the image sensing order.

Since the reference images are not encoded, if the number of reference images is increased, the total compression ratio lowers. However, if the number of reference images is too small, decoded data precision deteriorates. For this reason, the selection interval of reference images is set by comparing the quality of generated image data and the required quality of the system.

Image data other than the reference images then undergo compression. Each image is segmented into blocks having a predetermined size, and matching with each reference image is done in units of blocks to obtain relative position information (motion vector) with a reference image block that yields a minimum square error (step S702).

More specifically, image data is converted into YUV, and is subsampled to Y:U:V=4:1:1 to obtain 12-bit data per pixel. Then, the converted image data is segmented into 8×8 pixel blocks, and undergoes block matching with each reference image in units of pixels. In this case, since U and V are subsampled, they are doubled in the vertical and horizontal directions to adjust their image sizes to that of Y, and then undergo block matching.

Figure 8:
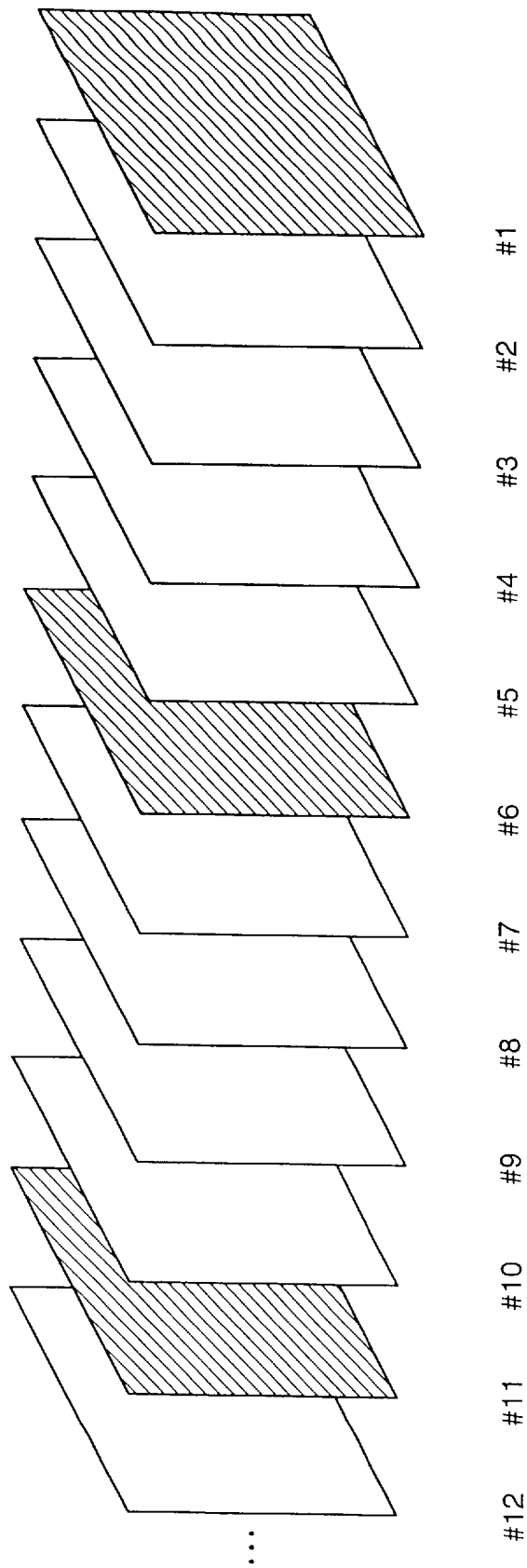
FIG. 8 is a view for explaining use of reference images.

A given image undergoes motion vector detection with only two reference images close to that image, and does not undergo any matching with other reference images or another image data. More specifically, when reference images (#1, #6, #11, ...) are set every fifth images, as shown in FIG. 8, image data #2 to #5 which are to undergo compression between neighboring two reference images #1 and #6 respectively undergo block matching with only reference images #1 and #6. In this manner, when the relationship with the reference images which are not encoded is detected, since image data other than those including pixels to be decoded need not be decoded, a high-speed decoding process can be assured.

A motion vector can be expressed by a total of 16 bits, i.e., 1-bit information indicating one of two reference images with which block matching is done, and information (7 bits in the vertical direction, 8 bits in the horizontal direction) indicating a relative position with respect to an 8×8 block which has matched in that reference image.

The difference (inter-frame difference) between the image data which is to undergo compression and the reference image based on which the motion vector is detected is computed (step S703), and the computed difference (error) data is DCT-encoded (step S704).

In order to achieve high-speed DCT computations, those based on an integer coefficient scheme may be used. For details of DCT computations based on the integer coefficient scheme, refer to Miyamoto et al., "Decoding of DCT-compressed Moving Image Data by Simplified Inverse Transform", The Institute of Electronics Engineers, '94 Spring Conference D-308, 1994.

Upon making DCT computations, in each of 64 pixels that form one block, a matrix formula with DCT coefficients, which is to be computed upon decoding, is expanded and saved in advance. In this case, the formula is expanded in the order from the DC component to high-frequency components of 64 DCT coefficients, i.e., in a so-called zigzag scan order. By omitting a predetermined number of coefficients in a high-frequency range from the formula, the computation volume upon decoding can be reduced. Also, DCT components are quantized using a quantization table normally used in MPEG encoding.

The quantized DCT coefficients then undergo vector quantization in units of YUV components (step S705). In this case, if variable-length encoding is done, random access in units of blocks (pixels) cannot be done upon decoding. Hence, vector quantization as fixed-length encoding is used.

Vector quantization is done in units of YUV components. In this case, high-frequency components of DCT coefficients can be omitted. The degree of omission can be appropriately set in correspondence with the complexity of the object shape and the image quality required for the system. According to the results experimentally obtained by the present inventor for some samples, if approximately the 30th and subsequent coefficients for a Y component, and approximately the 15th and subsequent coefficients for U and V components in the zigzag scan order were omitted, no image deterioration discernible in a still state was observed.

In such case, of the 64 DCT coefficients, first 30 coefficients for a Y component, and 15 coefficients for U and V components are handled as vectors to execute vector quantization.

A representative vector in vector quantization can be determined using various methods. For example, an LBG algorithm proposed by Y. Linde et al. in "An algorithm for vector quantizer design" (IEEE Trans. Comm., Vol. COM-28, No. 1, pp. 84–95, 1980) can be used. When the number of representative vectors is smaller than a default value, all vectors that have appeared can be processed as representative vectors.

Finally, the reference image data, the encoded image data as the vector quantization results, the motion vectors detected in step S702, and expansions in units of pixels obtained in step S704 are stored in the image database 7, thus ending the encoding process (step S706).

(Image Generation Process)

Figure 11:
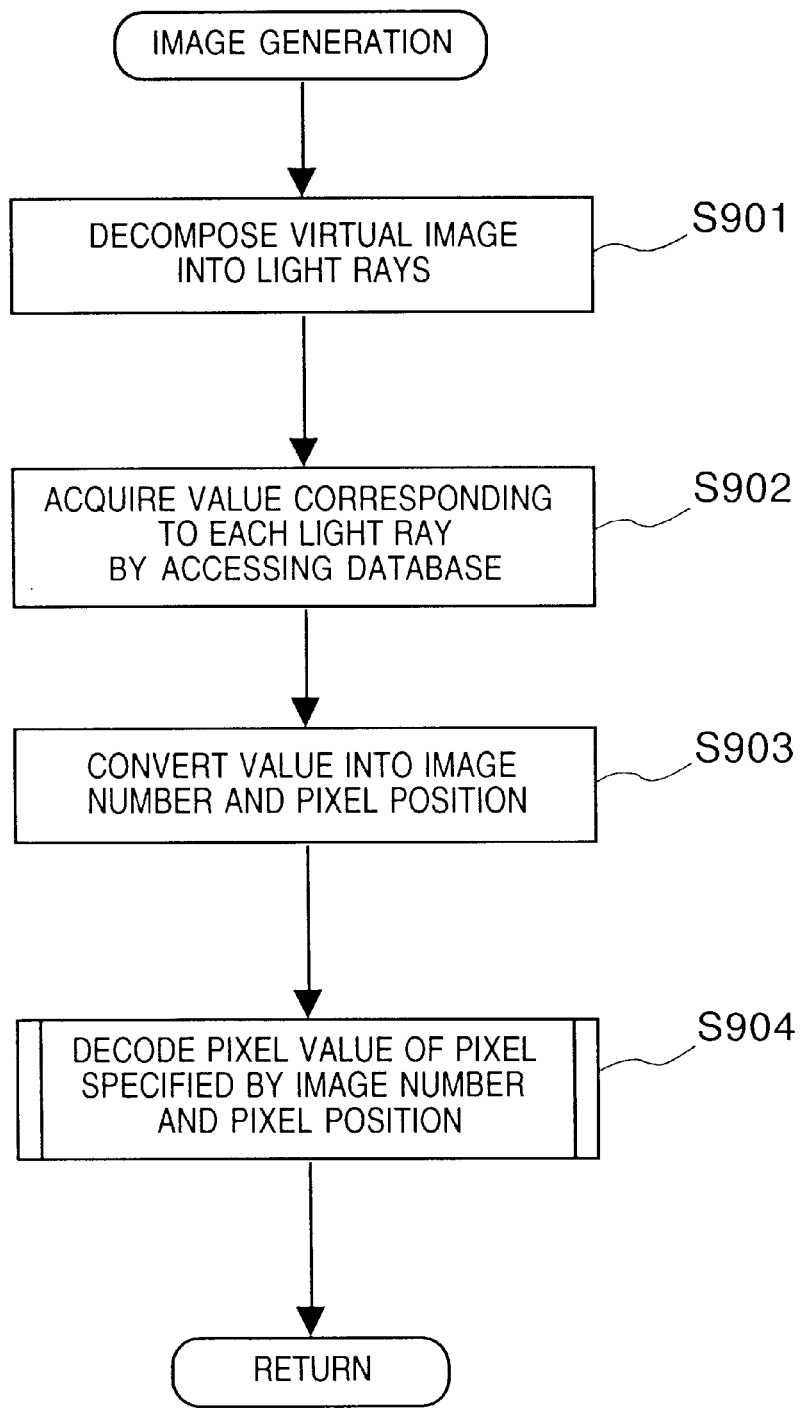
FIG. 11 is a flow chart for explaining the overall flow of an image generation process from an arbitrary viewpoint position and direction.
Figure 12:
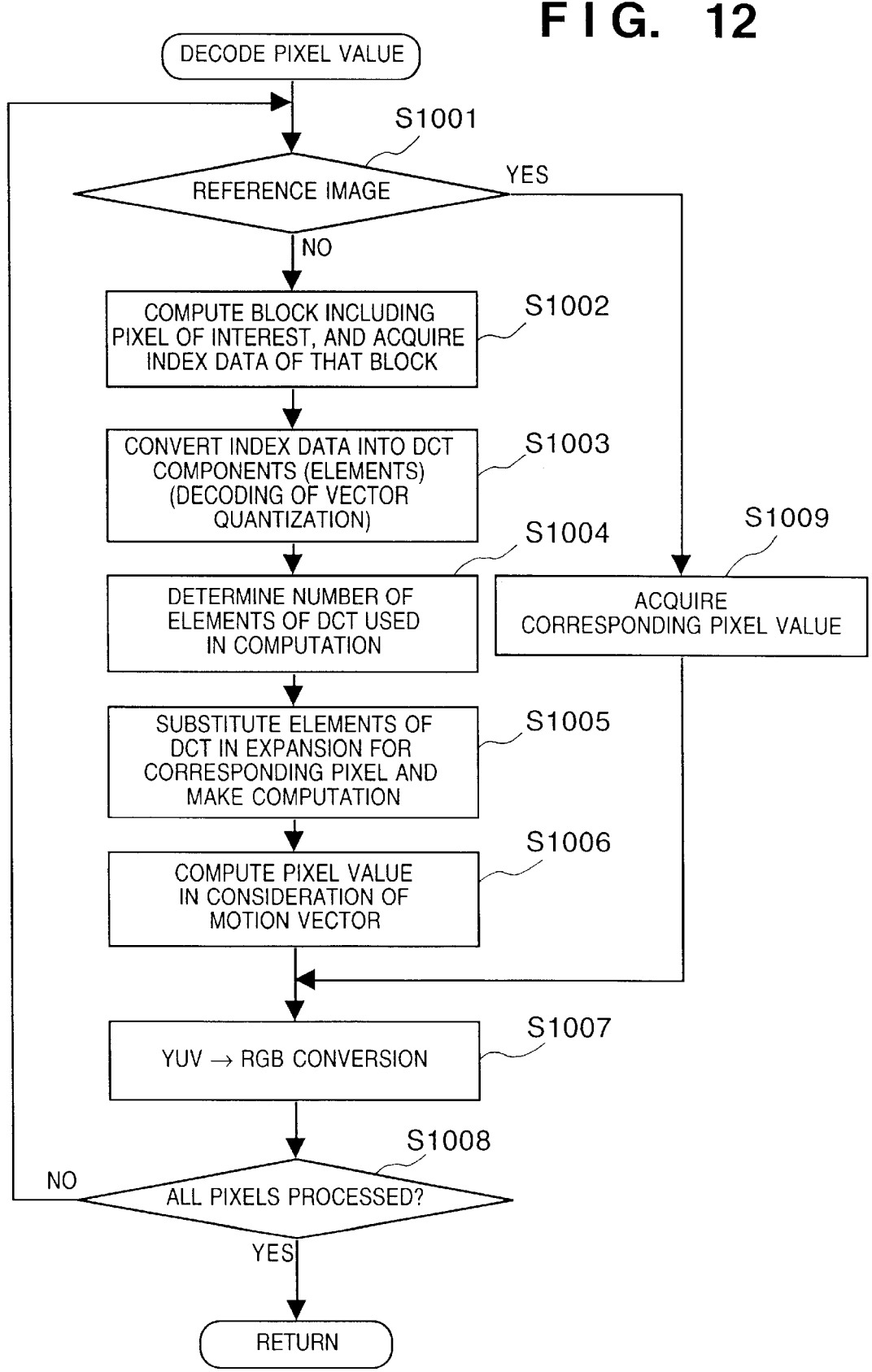
FIG. 12 is a flow chart for explaining the process of the decoding process step in FIG. 11.

The image generation process executed in step S104 in FIG. 2 will be described in detail below with reference to the flow charts shown in FIGS. 11 and 12.

When the user's viewpoint position and direction are detected by the sensor or the like attached to the HMD 6 or the like in step S103 (FIG. 2), a virtual camera is set at the detected viewpoint position and direction, and pixels of the first line of a virtual camera image are decomposed into a light ray group (step S901).

In step S902, the mapping position of each light ray in the light ray group obtained in step S901 in the ray space is obtained using equations (1) and (2) above. At this time, the x- and u-axes are quantized to maintain resolution compatibility as in encoding. Then, an element of the correspondence table corresponding to the mapping position of each light ray in the ray space, i.e., a set of image number of multi-viewpoint image data and pixel position is read out from the ray space database 8 (step S903).

For example, assuming that five light rays are respectively mapped at the positions of elements (−2, 2), (−1, 1), (0, 0), (1, −1), and (2, −2) in the ray space, values [5, 1], [2, 2], [2, 3], [4, 5], and [3, 4] recorded in these elements are read out.

Figure 9:
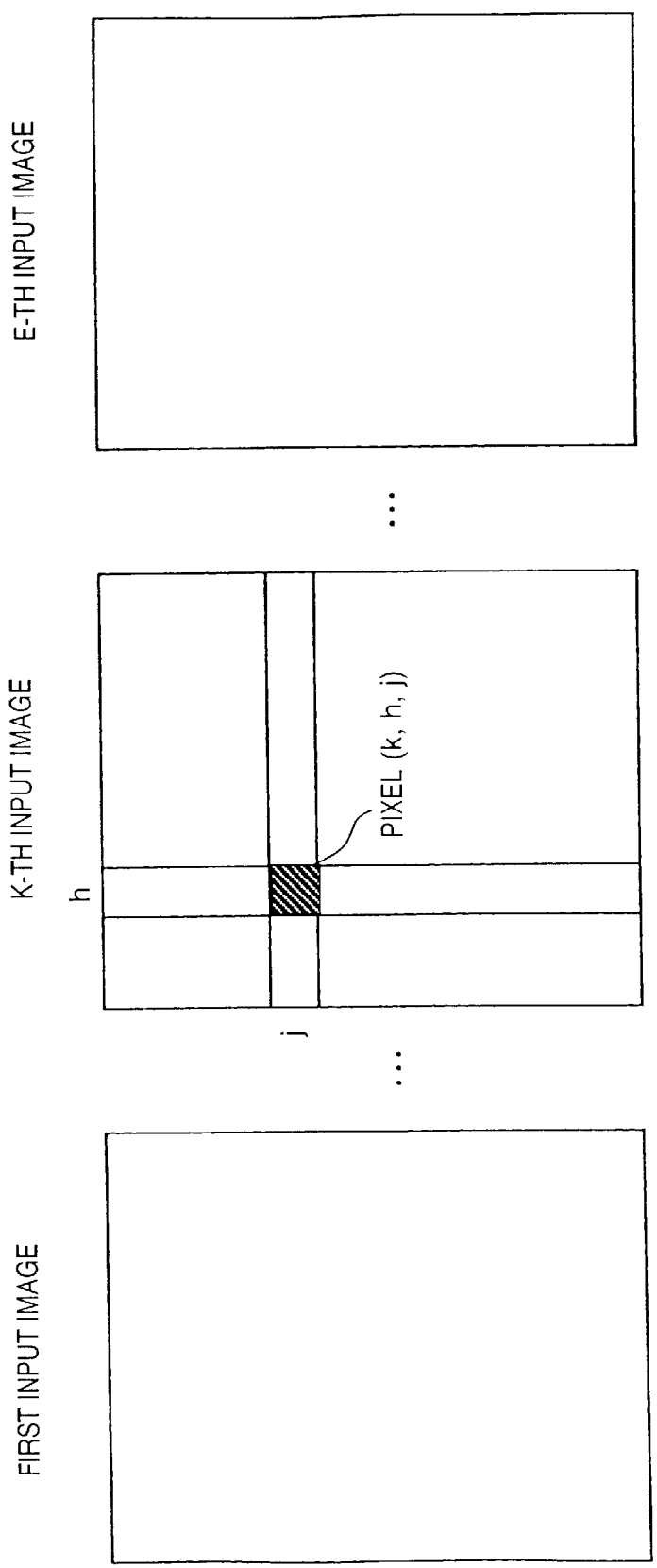
FIG. 9 is a view for explaining position expression of a pixel.

In this case, if a pixel which is located at a position defined by h pixels in the main scan direction and j pixels in the sub-scan direction in the k-th image is expressed by {k, h, j}, as shown in FIG. 9, when an image for the first line is generated to express pixel (1, 1) of generated image (x, y) by {5, 1, 1}, pixel (2, 1) by {2, 2, 1}, . . . , pixel (5, 1) by {3, 4, 1}, the values of an identical column appear to suffice like {5, 1, 2} for pixel (1, 2), {2, 2, 2} for pixel (2, 2), {2, 3, 2} for pixel (3, 2), . . . in the second line. However, since the correspondence table stores the mapping results for only the first line that ignore vertical disparity upon mapping in the ray space so as to reduce the data size, if the aforementioned process is done, the generated image distorts largely. Hence, this distortion must be corrected upon image generation. The correction method will be explained below.

Figure 10:
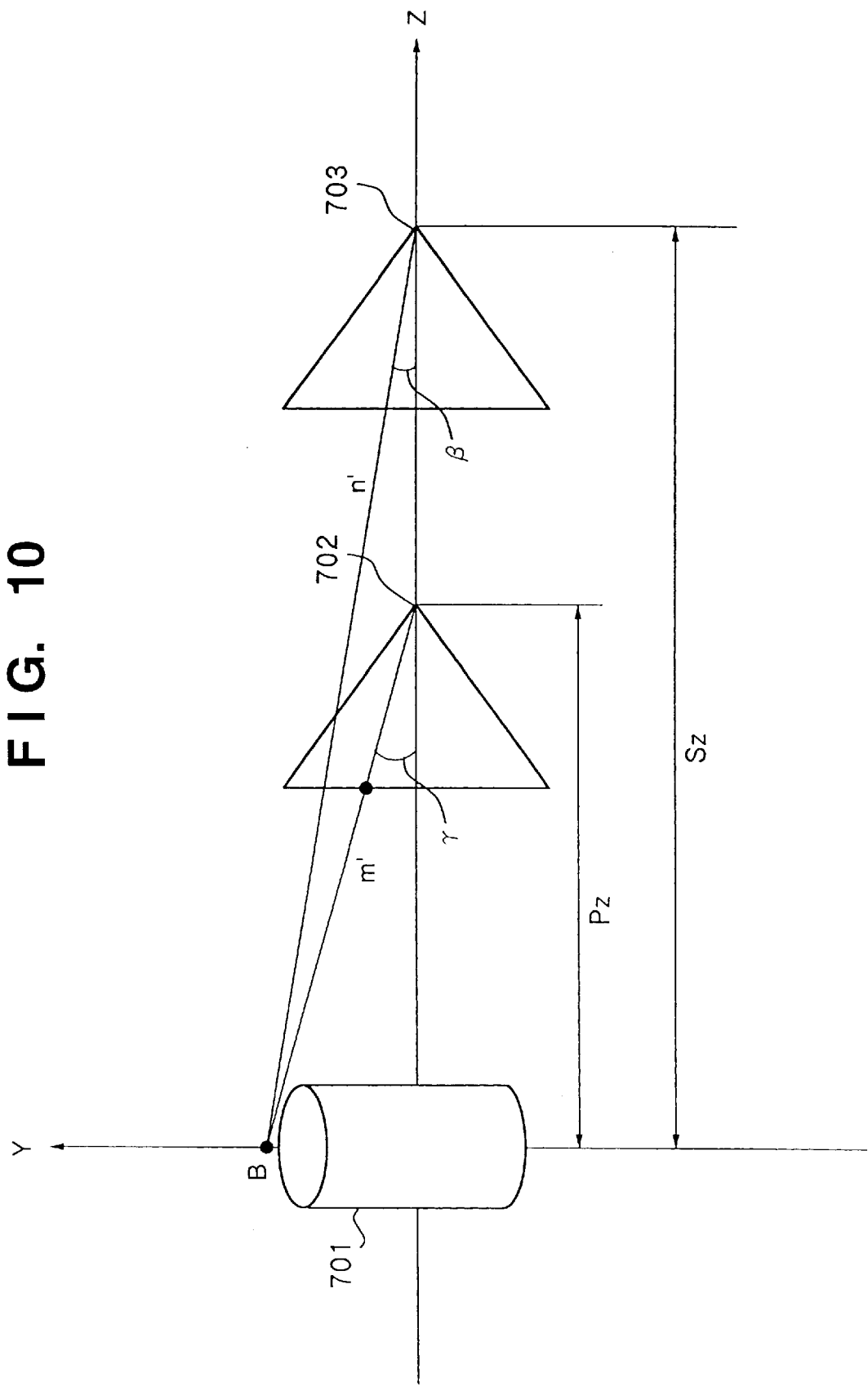
FIG. 10 is a view for explaining a disparity correction method in the Y-axis direction.

FIG. 10 shows the principle of correcting distortion of the generated image. Referring to FIG. 10, reference numeral 701 denotes an object; 702, an image at a viewpoint position P to be generated; and 703, an input image at a viewpoint position S.

One point B in the object 701 will be examined. Assume that the point B is close to the Y-axis, the z-coordinate values of the image 702 at the viewpoint position P to be generated and the image 703 at the viewpoint position S are sufficiently large, or the image 702 at the viewpoint position P to be generated and the image 703 at the viewpoint position S have approximately the same z-coordinate values. At this time, a light ray coming from the point B is recorded on the (m')-th line in the image 702 at the viewpoint position P to be generated, and the (n')-th line in the image 703 at the viewpoint position S.

Then, if d represents the pixel pitch of the virtual camera, f represents the focal length, n represents the total number of lines, Sz represents the distance from the image sensing point of an input image to the reference plane, and Pz represents the distance from the position of the generated image to the reference plane, we have:

$$Pz\cdot\tan\gamma = Sz\cdot\tan\beta \quad (4)$$

$$\tan\gamma = d\cdot(m'-n/2)/f \quad (5)$$

$$\tan\beta = d\cdot(n'-n/2)/f \quad (6)$$

Equations (4), (5), and (6) yield:

$$n' = n/2 + (m'-n/2)\cdot Pz/Sz \quad (7)$$

In this manner, the value of the (m')-th scan line of the image 702 at the viewpoint position P to be generated is equivalent to that of the (n')-th scan line of the image 703 at the viewpoint position S, which is given by equation (7). Therefore, the same pixel values as {5, 1, R_5_1}, {2, 2, R_2_1}, . . . , {3, 4, R_3_1} can be given to pixels (1, 1), (2, 1), . . . , (5, 1) of the generated image.

Note that R_i_j is a value computed using equation (7) on the basis of the i-th input image position, the generated image position, and the line position to be obtained in the generated image. As for pixels in the second and subsequent lines of the generated image, values of, for example, pixel (2, 4) and pixel (3, 7) are equivalent to those of pixels given by {2, 3, R_2_4} and {2, 3, R_2_7}. Therefore, when the pixel values are computed for all the pixels, as described above, a distortion-corrected image can be generated. When the value n' given by equation (7) satisfies n'≦0 or n'>n, a predetermined pixel value is used.

Based on the corrected pixel position, the corresponding pixel values of the corresponding image data are decoded in step S904, thus generating an image from an arbitrary viewpoint position and direction.

(Decoding Process)

The pixel data decoding process in step S904 in FIG. 11 will be described in more detail below with reference to the flow chart shown in FIG. 12.

It is checked if image data that includes the pixel to be read out is the reference image (step S1001). If the image data is the reference image, since it need not be decoded, a corresponding pixel value is read out from the image database 7 (step S1009), and the flow advances to step S1007.

On the other hand, if a pixel value to be obtained is included in image data other than the reference image, i.e., image data that has undergone compression, the decoding process is required. In this case, a block including the pixel to be decoded is specified, and encoded data (index data) corresponding to that block is read out from the image database 7 (step S1002).

Next, a set corresponding to the index data is checked using a vector quantization table (code book) to read out DCT components in units of YUV components (step S1003). In this embodiment, since the first to 28th coefficients for a Y component and the first to 10th coefficients for U and V components were vector-quantized upon encoding, coefficients, the number of which is the same as the number of vector-quantized coefficients, are obtained as decoding results of vector-quantized data.

Subsequently, the number of DCT coefficients used upon decoding pixel values, i.e., upon making computations using the expansion is determined (step S1004). As described above, since the expansion is formed to make product-sum computations of DCT coefficients in the zigzag scan order from the DC component, the precision of a pixel value obtained by decoding can be controlled by changing the number of coefficients used in computations. When high precision is required or when a long computation time is acceptable, the number of coefficients used can be set to be large; conversely, when a short computation time is required rather than high precision, the number of coefficients can be set to be small.

The number of DCT coefficients used need not be fixed, but can be changed dynamically. For example, when the user is moving like in a walk-through mixed reality presentation application, the number of coefficients used is decreased to assure high computation speed rather than high precision; when the user stands still, the number of coefficients is increased to assure higher image quality rather than high computation speed, thus allowing appropriate processes corresponding to various situations.

After the number of coefficients is determined, the coefficients are substituted in the expansion for each pixel, which is prepared in advance, to make a computation (step S1005). Since the computation result is an error component of disparity-compensated (motion-compensated) encoding, a corresponding pixel value is read out from the reference image used as a disparity-compensated encoding target with reference to the motion vector of the corresponding block, and the error component is added to that pixel value to obtain a final pixel value (step S1006).

The pixel value expressed by YUV is converted into RGB to display an image (step S1007). It is checked in step S1008 if decoding is complete for all required pixels. If pixels to be processed still remain, the flow returns to step S1001 to repeat the aforementioned process. If decoding for all the pixels is complete, the image generation process ends.

(Data Compression Effect)

Using the above-mentioned encoding/decoding conditions, the compression ratio was verified. As objects to be captured, a basket of live flowers and a stuffed animal were selected as those having complicated shapes that are hard to express by polygons.

As multi-viewpoint images, the objects were placed on a horizontal turntable, and a total of 90 images are captured through 360°. The horizontal field of view of the camera was 40°, and the resolution per image was 640×480 pixels. Also, each image was captured using a blue back, and only an object portion was extracted from the captured data.

Ten out of such 90 multi-viewpoint images were selected as reference images, and the remaining images were compressed under the aforementioned conditions. As a result, the data size was reduced to 1/15 to 1/20 compared to that before compression. Note that this value is obtained by comparison with multi-viewpoint image data, and when the data size is compared with that of data obtained by mapping all multi-viewpoint image data in the ray space, a higher compression ratio is obtained.

In the aforementioned embodiment, a motion vector is used to reduce the data size. Alternatively, other methods may be used. Likewise, vector quantization is used as fixed-length encoding, but other methods may be used.

In the above description, an expansion for inverse DCT computations is generated upon encoding, but may be generated at other timings as long as the expansion can be used upon decoding.

Images designated as reference images may be obtained using correlation of input images. That is, reference images need not be designated at equal intervals, and the density of reference images (the density in this case indicates the designation interval of reference images) may be locally changed. For example, when images include many high-frequency components (the captured object has a complicated shape, a large number of colors, and the like), reference images may be designated densely; when images include many low-frequency components (neighboring images change little), reference images may be designated coarsely.

More specifically, when input images are numbered 0 to N, if images #0 to #20 include many high-frequency components, images #0, #3, #6, #9, #12, #15, #18, and #21 may be designated as reference images, and images #30, #40, . . . , #N may be designated as reference images from images #21 to #N. Note that this is merely an example, and the present invention is not limited to this particular example.

Furthermore, in the above embodiment, as an example, 28 DCT-transformed components for Y and 10 DCT-transformed components each for U and V are held in units of blocks. At this time, if each of 28 Y components is expressed by 1 byte, the vector quantization table requires 28 bytes for each index.

Normally, since high-frequency components have less influence on image reconstruction, the number of bits to be assigned may be increased for components that largely contribute to image reconstruction, i.e., for low-frequency components, and the number of bits to be assigned may be decreased for high-frequency components, thus reducing the size of the vector quantization table.

For example, when 28 components are arranged in the zigzag scan order, 8 bits each are assigned to the first 6 components, 6 bits each to the next 4 components, and 4 bits each to the remaining 18 components. In this manner, 28 components can be expressed by 18 bytes, and the vector quantization table size can be reduced. When the same bit assignment is applied to U and V components, their table sizes can be reduced.

The aforementioned embodiment has exemplified only a case wherein reference images are processed as non-compressed data which are not encoded. However, when reference image data are stored in, e.g., a hard disk, they may be compressed. When data are compressed, they are expanded upon being loaded from the disk to a computer and, after that, the method described in the above embodiment can be applied.

A group of reference images and encoded data may undergo reversible compression, e.g., entropy encoding such as Lempel-Ziv encoding or the like to further reduce the data size. Whether or not such data compression is used can be determined in consideration of the balance between computation cost upon expanding data, and the data storage or communication cost.

For example, when data is sent using a communication line with a narrow bandwidth, an increase in communication time due to a large data size poses a problem rather than the computation cost. In such case, re-compression is used. On the other hand, when a sufficiently large disk size can be used or data is transferred using a communication line with a broad bandwidth, since the computation time required for expansion poses a problem rather than the transfer time in such case, re-compression is not used. In this manner, the compression schemes can be selectively used in correspondence with various situations.

As described above, according to the encoding/decoding method and apparatus of the present invention, since an inverse DCT formula is expanded in units of pixels, and DCT coefficients undergo fixed-length encoding, high-efficiency compression and easy decoding in units of pixels can be achieved.

Furthermore, the present invention can be applied to the system comprising either a plurality of units or a single unit.

It is needless to say that the present invention can be applied to the case which can be attained by supplying programs which execute the process defined by the present system or invention.

What is claimed is:

1. A method of encoding an image data group including a plurality of image data, comprising:

the reference image selection step of selecting a predetermined number of references image(s) from the plurality of image data;

the step of segmenting each of the image data other than the reference image(s) into blocks each having a predetermined size;

the step of detecting an area, which is included in the reference image(s), has the same size as the predetermined size, and has a (predetermined number)-th highest data correlation with a block, and detecting a relative positional relationship with the detected area;

the step of computing difference data between pixel data of the block and pixel data of the area, the positional relationship of which has been detected;

the orthogonal transform step of computing an orthogonal transform of each of image data other than the reference images in units of blocks each having the predetermined size;

the step of selecting a preset number of data as data to be encoded from the data obtained after the orthogonal transforms are computed; and the encoding step of fixed-length encoding and outputting the data to be encoded as encoded image data, wherein the orthogonal transform step includes the step of computing an orthogonal transform of the difference data.

2. The method according to claim 1, wherein said reference image selection step selects a plurality of reference images.

3. The method according to claim 2, wherein the number of reference images from which the positional relationship is detected is limited to be smaller than the total number of reference images included in the image data group.

4. The method according to claim 2, wherein the plurality of image data are numbered under a predetermined condition, the reference images are selected every predetermined number of image data, and the number of reference images from which the positional relationship is detected is limited to a predetermined number of reference images from a reference image close to the number of image data having the blocks.

5. The method according to claim 2, wherein the plurality of image data are numbered under a predetermined condition, and the reference images are dynamically determined in accordance with correlation levels and/or a distribution of frequency components of the plurality of image data with several numbers.

6. The method according to claim 1, wherein the plurality of image data are image data obtained by sensing a single object from many directions, and said method further comprises the table generation step of mapping pixels included in a predetermined area of the image data in a ray space, and generating a correspondence table which represents a correspondence between coordinates of the pixels in the ray space and pixel positions of the image data.

7. The method according to claim 1, wherein the fixed-length encoding step includes the step of changing a code length to be assigned in correspondence with a frequency component expressed by the data to be encoded.

8. The method according to claim 1, further comprising the step of generating an inverse transform formula of the orthogonal transform in units of pixels that form the block.

9. The method according to claim 1, further comprising the reference image encoding step of compressing the reference images.

10. The method according to claim 1, further comprising the compression step of compressing the reference images and the encoded image data.

11. An image data decoding method for decoding a subject pixel from encoded image data which have undergone fixed-length encoding after orthogonal transform in units of blocks, comprising:

the storing step of storing inverse transform formulas of the orthogonal transform for each of the pixels in each block, in advance, the first decoding step of decoding the fixed-length encoded data;

the number determination step of determining the number of coefficients used in the inverse transform formulas; and the second decoding step of selecting a plurality of coefficients of the orthogonal transform from coefficients of the orthogonal transform obtained in the first decoding step and decoding the subject pixel by applying the selected coefficients to the inverse transform formulas that correspond to the subject pixel.

12. The method according to claim 11, wherein the number determination step includes the step of dynamically changing the number of coefficients to be determined.

13. An apparatus for encoding an image data group including a plurality of image data, comprising:

reference image selection means for selecting a predetermined number of reference image(s) from the plurality of image data;

means for segmenting each of the image data other than the reference images into blocks each having a predetermined size;

means for detecting an area, which is included in the reference image, has the same size as the predetermined size, and has a (predetermined number)-th highest data correlation with a block, and detecting a relative positional relationship with the detected area;

means for computing difference data between pixel data of the block and pixel data of the area, the positional relationship of which has been detected;

orthogonal transform means for computing an orthogonal transform of each of image data other than the reference images in units of blocks each having a predetermined size;

selection means for selecting a preset number of data as data to be encoded from the data obtained after the orthogonal transforms are computed; and encoding means for fixed-length encoding and outputting the data to be encoded as encoded image data, wherein said orthogonal transform means computes an orthogonal transform of the difference data.

14. The apparatus according to claim 13, wherein said selection means selects a plurality of reference images.

15. The apparatus according to claim 14, wherein the number of reference images from which the positional relationship is detected is limited to be smaller than the total number of reference images included in the image data group.

16. The apparatus according to claim 14, wherein the plurality of image data are numbered under a predetermined condition, the reference images are selected every predetermined number of image data, and the number of reference images from which the positional relationship is detected is limited to a predetermined number of reference images from a reference image close to the number of image data having the blocks.

17. The apparatus according to claim 14, wherein the plurality of image data are numbered under a predetermined condition, and the reference images are dynamically determined in accordance with correlation levels and/or a distribution of frequency components of the plurality of image data with serial numbers.

18. The apparatus according to claim 13, wherein the plurality of image data are image data obtained by sensing a single object from many directions, and said apparatus further comprises table generation means for mapping pixels included in a predetermined area of the image data in a ray space, and generating a correspondence table which represents a correspondence between coordinates of the pixels in the ray space and pixel positions of the image data.

19. The apparatus according to claim 13, wherein said encoding means changes a code length to be assigned in correspondence with a frequency component expressed by the data to be encoded.

20. The apparatus according to claim 13, further comprising inverse transform formula generation means for generating an inverse transform formula of the orthogonal transform in units of pixels that form the block.

21. The apparatus according to claim 13, further comprising reference image encoding means for compression-encoding the reference images.

22. The apparatus according to claim 13, further comprising compression means for compressing the reference images and the encoded image data.

23. An image data decoding apparatus for decoding a subject pixel from encoded image data which have undergone fixed-length encoding after orthogonal transform in units of blocks, comprising:

storing means for storing inverse transform formulas of the orthogonal transform for each pixel in each block, in advance, first decoding means for decoding the fixed-length encoded data;

number determination means for determining the number of coefficients used in the inverse transform formulas; and second decoding means for selecting a plurality of coefficients of the orthogonal transform from coefficients of the orthogonal transform obtained in the first decoding means and decoding the subject pixel by applying the selected coefficients to the inverse transform formulas that correspond to the subject pixel.

24. The apparatus according to claim 23, wherein said number determination means dynamically changes the number of coefficients to be determined.

25. A virtual image generation apparatus comprising:

table generation means for mapping a ray space a plurality of pixels included in a predetermined area of each of a plurality of image data obtained by sensing an identical object from different viewpoints, and generating a table indicating a correspondence between coordinates in the ray space and pixel positions in the image data;

reference image selection means for selecting a predetermined number of reference images from the plurality of image data;

orthogonal transform means for computing an orthogonal transform of each of image data other than the reference images in units of blocks each having a predetermined size;

formula generation means for generating an inverse formula of the orthogonal transform in units of pixels that form the block;

encoding means for fixed-length encoding the image data that have undergone the orthogonal transform and outputting the transformed image data as encoded image data;

light ray conversion means for converting the object into a light ray group on the basis of externally supplied data indicating a viewpoint position and direction;

pixel position detection means for detecting a pixel position of each of light rays included in the converted light ray group in the corresponding image data with reference to the table;

first decoding means for decoding the fixed-length encoded data corresponding to the pixel position detected by said pixel position detection means;

number determination means for determining the number of coefficients used in the formulas from coefficients of the orthogonal transform obtained by said first decoding means second decoding means for decoding pixel data by applying the number of coefficients determined by said number determination means to the inverse transform formulas; and image generation means for generating an image of the object viewed from the viewpoint position and direction on the basis of the decoded pixel data.

26. An mixed reality space presentation system having:

viewpoint position information acquisition means for acquiring a viewpoint position and direction of a user; and display means for presenting to the user an mixed reality space obtained by mixing a real space and a virtual space image, wherein an image of an object viewed from the viewpoint position an direction of the user is generated using a virtual image generation apparatus cited in claim 25, and is displayed on said display means.

27. A storage medium storing an image data encoding method cited in claim 1 as a program that can be executed by a computer apparatus.

28. A storage medium storing an image data encoding method cited in claim 11 as a program that can be executed by a computer apparatus.

29. A storage medium according to claim 28, further storing an image data encoding method cited in claim 13 as a program that can be executed by a computer apparatus.

* * * * *